United States Patent [19]
Payen

[11] 3,827,649
[45] Aug. 6, 1974

[54] CLICK PAWL DEVICE
[75] Inventor: Jean Noel Payen, Aix-les-Bains, France
[73] Assignee: Etablissements Carpano & Pons S. A., Cluses, France
[22] Filed: June 27, 1972
[21] Appl. No.: 266,546

[30] Foreign Application Priority Data
June 30, 1971  France .............................. 71.23932

[52] U.S. Cl. .......... 242/84.1 R, 74/577 S, 188/82.7, 242/84.51 R
[51] Int. Cl. .......................................... A01k 89/02
[58] Field of Search ........ 242/84.51 R, 84.1 R, 219, 242/84.5 R; 188/82.7; 74/530, 577 S, 577 M

[56] References Cited
UNITED STATES PATENTS
1,398,189  11/1921  Hodges et al. ............... 242/84.51 R
FOREIGN PATENTS OR APPLICATIONS
687,539  2/1953  Great Britain ............... 242/84.51 R
815,739  7/1959  Great Britain ................ 242/84.1 R
132,670  9/1919  Great Britain ............... 242/84.51 R Primary Examiner—Billy S. Taylor
Attorney, Agent, or Firm—Robert E. Burns; Emmanuel J. Lobato; Bruce L. Adams

[57] ABSTRACT

A click pawl device for fishing reels includes a pivoted triangular click pawl having an apex urged into operative contact with a rotatable toothed wheel by a spring wire including (a) an elongate substantially rectilinear central portion bearing against a face of the pawl opposite said apex and (b) two bent-over portions including ends protruding outwardly from said face of the pawl and from the toothed wheel. Said ends can be selectively placed in inwardly directed notches spaced apart along an arcuate member disposed substantially concentrically to the axis of the wheel, to enable variation at will of the noise and braking effect produced by the click pawl for both directions of rotations of the wheel.

4 Claims, 8 Drawing Figures

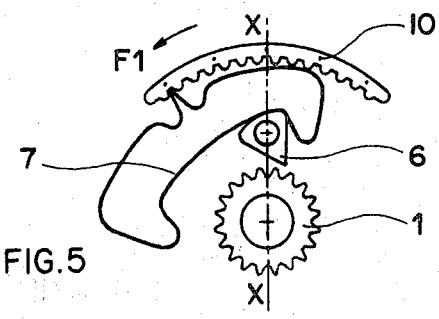
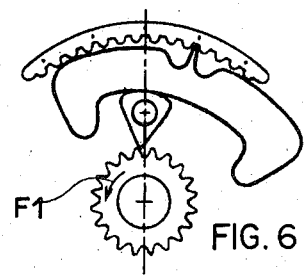
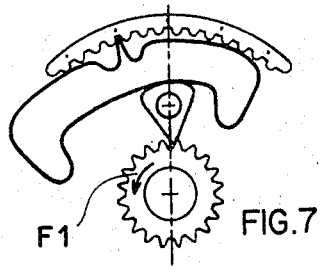
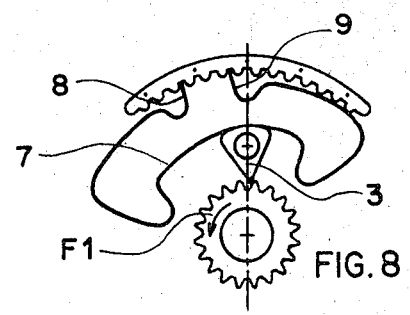

CLICK PAWL DEVICE

The invention relates to click pawl devices, i.e. mechanisms in which the rotation of a toothed wheel causes oscillating movement of a click pawl having an apex urged into operative contact with the teeth of the wheel by means of a spring, this oscillation producing a rattling noise and braking rotation of the toothed wheel.

Such devices are notably employed in fishing reels for fly casting, comprising a small winch-like reel including a line spool and an actuating handle by means of which the fishing line may be wound onto or unwound from the spool. During fishing, the line must not unwind too freely from the spool, since otherwise it may tangle. Braking means are therefore provided, the best known type being a click pawl device including a toothed wheel coaxially fixed to the spool, at least one click pawl pivotally mounted to the reel frame, and an apex of the pawl being urged into operative contact with the teeth of the wheel by means of a spring. As the wheel rotates, each tooth lifts up the apex of the pawl and then allows it to drop, thereby braking rotation of the wheel and making a rattling noise. Examples of known reels of this type are described in U.K. Patent Specification No. 687,539 and U.S. Pat. No. 2,569,322.

On certain reels, the click pawl device is unidirectional, i.e. the shapes of the apex of the pawl and the teeth of the wheel are such that rotation of the spool is allowed in only one direction. The invention concerns both unidirectional click pawl devices for this type of reel, as well as click pawl devices for reels in which the spool may turn in the two directions. In this latter type of reel, the toothed wheel generally has symmetrically shaped teeth and the pawls generally have a substantially triangular shape. The force of the spring holding the apex of the pawl against the toothed wheel is sometimes made adjustable at will by the angler, who should be able to precisely adjust said force of the spring to obtain a desired braking force and noise in both of the following cases:

1. When the line is wound onto the spool by turning the handle.
2. When the line is pulled out, which makes the spool turn in a direction to unwind the line.

Moreover, mainly for the sake of simplification of production, manufacturers must provide reels suitable for use either by right handed or left handed anglers. It is thus essential that for the same reel the two types of adjustment set out above must be available for both directions of rotation.

In known reels including adjustment means for this purpose, for example that disclosed in U.K. Patent Specification No. 815,739, these adjustments can only be achieved by relatively complicated manipulations such as dismantling to turn over or adjust the position of the spring and/or the pawl.

The invention therefore aims to provide a click pawl device suitable for incorporation into fishing reels for use by right handed and left handed persons, in which the intensity of the noise and braking effect produced by the click pawl are adjustable by a simple manipulation.

According to the invention, a click pawl device comprises a rotatable toothed wheel, a pivotally mounted substantially triangular click pawl including an apex adapted to operatively contact the teeth of the wheel, a spring acting on the click pawl for urging the apex into operative contact with the teeth of the wheel, and means for adjusting the intensity of the braking effect and noise produced by the click pawl upon rotation of the wheel, in which said spring is formed of a spring wire including (a) an elongate central substantially rectilinear portion adapted to bear against a face of the pawl opposed to said apex and (b) two bent-over portions including ends protruding outwardly from said face of the pawl and from the toothed wheel, the device including means for engaging said ends in selected positions about an arc disposed substantially concentrically to the axis of the toothed wheel.

In a preferred embodiment, said engaging means include an arcuate member secured to a frame of the device, said arcuate member including a plurality of inwardly-facing notches disposed longitudinally thereof in spaced-apart relationship, each notch being adapted to receive one or both of said ends.

The braking effect and noise produced by the click pawl can thus be adjusted by selectively placing said ends in the notches.

The arcuate member may advantageously be disposed substantially centrally of a line passing through the axis of rotation of the toothed wheel and the axis of pivoting of the click pawl, a central one of the notches lying along said line, and the other notches being disposed symmetrically about said line.

At least one extreme end notch may be positioned so that when the ends of the spring are engaged therein, the spring urges said face of the click pawl to keep the apex out of operative contact with the teeth of the wheel, so that the toothed wheel may be rotated without the click pawl producing a braking effect or noise.

In an embodiment in which the device is enclosed in a housing, for example of a fishing reel, the engaging means may include a member engaging said ends and means accessible from outside the casing for moving the member about said arc, whereby the position of the ends of the spring in relation to the click pawl can be adjusted without touching the spring.

The invention will now be particularly described, by way of example, with reference to the accompanying drawings, in which:

FIG. 1 schematically shows a click pawl device according to the invention in a first position; and FIGS. 2 to 8 show the same device in different positions of the spring to provide different adjustments of the noise and braking effect.

With reference to FIG. 1, a toothed wheel 1 is securely fixed, by any known means, integral with a line spool 2 of a fishing reel. A substantially triangular pawl 3 having two rounded apices 4 and 5, and a third pointed apex 6 adapted to protrude into the space between adjacent teeth of wheel 1, is pivotally mounted on a frame of the reel about an axis 11.

On the rear face of the pawl, between apices 4 and 5, i.e. opposite apex 6, bears an elongate central part of a spring wire 7. Said central part of the spring 7 is normally substantially rectilinear, i.e. in its unstressed state, and is extended by bent-over portions terminating with ends 8 and 9 protruding outwardly from said face of the pawl 3 and from the toothed wheel 1. The exact form of spring 7 shown in FIG. 1 is not essential, providing that the spring adopts the general configuration referred-to and is sufficiently long to ensure its flexibility.

The spring 7 may have any section whatsoever. However, a flattened shape obtained by squashing a round wire is particularly suitable, one of the flats normally bearing against the rear face of pawl 3. The spring 7 may be formed of a highly elastic metallic wire, such as piano string or of bronze, for example beryllium bronze.

The two ends 8 and 9 of spring 7 constantly tend to separate from one another because of the elasticity of the material. In the position of FIG. 1, the ends are held together by engagement in the bottom of a central notch of an arcuate member 10 including a plurality of inwardly-facing spaced-apart notches, disposed longitudinally thereof. The member 10 is integral with the reel frame, and is disposed with the central notch lying along a line X—X through the axis of rotation of wheel 1 and the axis 11 of pawl 3, the other notches being arranged symmetrically on either side of line X—X.

The device operates as follows: any rotational movement transmitted by the spool 2 to toothed wheel 1 in direction F1 causes lifting up of the apex 6 of pawl 3 which pivots about shaft 11. In so doing, the rounded apex 5 of pawl 3 lifts up and compresses spring 7. When the apex 6 slips over the point of a tooth of the wheel 1, spring 7 relaxes and abruptly moves the pawl 3 back into the position of FIG. 1. This sequence is repeated for each passage of a tooth of wheel 1, and the successive jumps of pawl 3 produce a rattling noise and a braking of the rotation of wheel 1 and spool 2.

If spool 2 is turned in direction F2, operation is exactly the same, with the same intensity of noise and the same braking effect, since the members are symmetrical about line X—X.

If the ends 8 and 9 of spring 7 are manually separated and are made to engage in two notches of the member 10 as shown in FIG. 2, with the members still disposed symmetrically about line X—X, it can be seen that the spring 7 is deformed so as to provide an increased pressure on the rear face of pawl 3. Consequently, any rotational movement of wheel 1 in either direction is braked by the successive jumps of pawl 3 more strongly than for the position of FIG. 1. The intensity of the noise produced is also greater. It is thus possible to equally adjust the braking effect and the noise for both directions of rotation.

Movement of the ends 8 and 9 of spring 7 can be carried out very easily by means of a pointed tool, for example a pencil.

Moreover, if the ends 8 and 9 of spring 7 are moved together and placed in the same non-central notch of sector 10, in the position of FIG. 3, at rest the apex 6 of pawl 3 is held slightly to the right of line X—X. Consequently, if the wheel 1 is rotated in direction F1, each tooth of the wheel 1 must move the pawl 3 by a greater angle than for the case when the wheel 1 is driven in direction F2. Consequently, the noise and braking effect produced will be greater for rotation of wheel 1 in direction F1 than for direction F2. This feature is useful when the angler desires that the noise and braking be lesser for winding line onto the spool than for when line is being unwound, for example if a fish caught on the hook is fighting and moves away.

FIG. 4 shows a position of the spring 7 and pawl 3 similar to that of FIG. 3, but when the angler desires to increase the braking and noise even more. For this purpose, the two ends of spring 7 are separated and spaced-apart as in FIG. 2, but retaining an asymmetric position as in FIG. 3.

The positions of the spring 7 shown in FIGS. 3 and 4 may also be inverted symmetrically in relation to line X—X, so that the sought effects can be achieved when the reel is used both by right handed and left handed anglers, without requiring any manipulation other than the movement of the ends of spring 7.

FIG. 5 shows an extreme asymmetric case, in which the two ends of spring 7 are held together in an extreme end notch spaced well away from the line of symmetry X—X. In this case, the spring 7 urges the rear face of pawl 3 so that apex 6 is held out of operative contact with the teeth of wheel 1. The click pawl device thus no longer operates, and wheel 1 and spool 2 rotate without noise or braking.

FIGS. 6, 7 and 8 show the possibilities of adjustement in the case of a fishing reel provided for unidirectional operation, i.e. in which the wheel 1 can only turn in a single direction F1.

FIG. 6 shows the spring placed in a position such that the pawl only lightly engages with the teeth of the wheel. The noise and braking effect produced are thus relatively low.

To the contrary, FIG. 7 shows a position of the spring for which the point of the pawl, in order to move out of the path of the teeth of the wheel, must move through a much greater angle than for FIG. 6. The noise and braking effect produced are thus appreciably greater.

In FIG. 8, the pressure of spring 7 on pawl 3 is increased by spacing apart the ends 8 and 9 whilst retaining the inclination of pawl 3 shown in FIG. 7. Consequently, the noise and braking effect produced when the wheel is rotated in direction F1 are increased.

Figure 1:
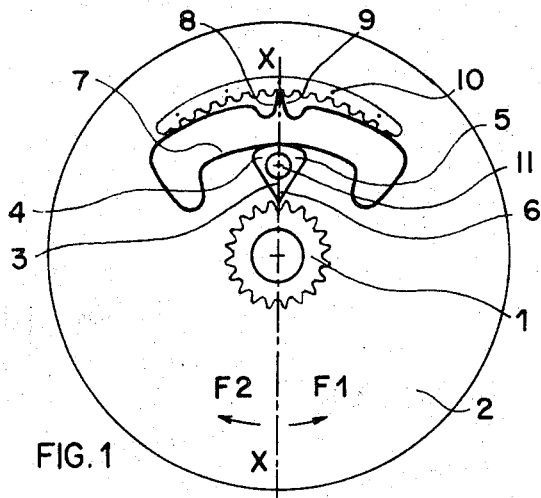
Figure 2:
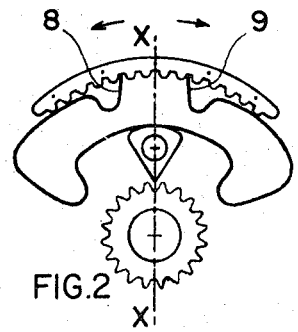
Figure 3:
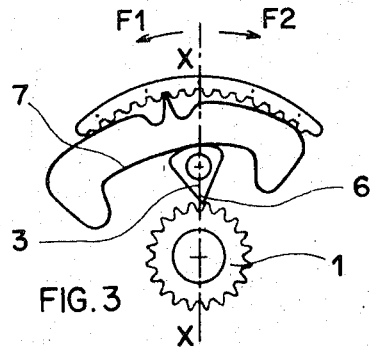
Figure 4:
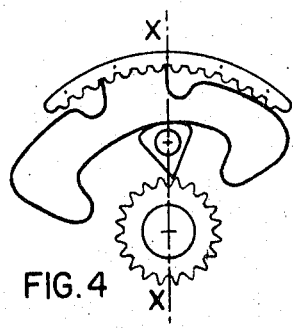

The device shown in FIGS. 1 to 8 is only given by way of example, and various modifications may be made thereto. In particular, the shape of spring 7 can be varied from that shown, whilst carrying out the same functions. Moreover, it may be advantageous to leave the ends of the spring in a single location, and obtain different adjustments by moving the bearing point of the said ends along a substantially arcuate path, for example by means of a screw moving in an opening of a reel casing, and which the angler would manipulate as a function of the desired values of noise and braking. Similarly, the device shown includes an arcuate member integral with the reel frame, but it would be possible to use an arcuate member independent of or movably mounted on said frame or on another support.

The described click pawl device and variations thereof are notably useful in the case where an experienced and hard-to-please angler requires to adjust the noise and braking during winding or unwinding of line onto or from the spool of his reel at will. The device may also be used in any case where a rotating mechanism must be braked in the two directions with a precisely adjustable braking force and/or accompanying noise.

What is claimed is:

1. A pawl and ratchet assembly comprising, a rotatably mounted ratchet wheel, a pivotally mounted substantially triangular pawl having an apex for engaging said ratchet wheel and a face opposite said apex, a spring biasing said pawl to maintain engagement with said ratchet wheel, said spring comprising an elongated portion for bearing against said face of said pawl and two bent end portions each having an end projecting in a direction away from said pawl and said ratchet wheel, and means for adjusting a bias force applied by said spring to said pawl comprising means for engaging said ends of said spring at selected different positions on an arc disposed substantially concentrically on an axis of rotation of said ratchet wheel.

2. A pawl and ratchet assembly according to claim 1, wherein said means for engaging said projecting ends of said spring comprise, an arcuate member having a plurality of notches disposed spaced along said arcuate member and facing said spring, said notches receiving said projecting ends of said spring.

3. A pawl and ratchet assembly according to claim 2, wherein said arcuate member includes a central notch and is disposed substantially symmetrically about a line passing through the axis of rotation of said ratchet wheel and a pivotal axis of said pawl so that said central notch lies on said line.

4. A pawl and ratchet assembly according to claim 2, wherein said arcuate member includes an end notch for engaging said projecting ends of said spring to bias said pawl to disengage said ratchet wheel.

* * * * *